US00RE47615E

(19) United States
(12) Reissued Patent
Sakakibara

(10) Patent Number: US RE47,615 E
(45) Date of Reissued Patent: Sep. 24, 2019

(54) INKJET RECORDING APPARATUS

(71) Applicant: Brother Kogyo Kabushiki Kaisha, Nagoya-shi, Aichi-ken (JP)

(72) Inventor: Akihiro Sakakibara, Toyota (JP)

(73) Assignee: Brother Kogyo Kabushiki Kaisha, Nagoya-shi, Aichi-ken (JP)

(21) Appl. No.: 15/408,810

(22) Filed: Jan. 18, 2017

Related U.S. Patent Documents

Reissue of:
(64) Patent No.: 9,044,951
Issued: Jun. 2, 2015
Appl. No.: 14/197,783
Filed: Mar. 5, 2014

(30) Foreign Application Priority Data

Mar. 11, 2013 (JP) ..... 2013-048044

(51) Int. Cl.
*B41J 2/165* (2006.01)
*B41J 23/02* (2006.01)
*B41J 29/02* (2006.01)
*B41J 29/38* (2006.01)

(52) U.S. Cl.
CPC ..... *B41J 2/16532* (2013.01); *B41J 23/025* (2013.01); *B41J 29/02* (2013.01); *B41J 29/38* (2013.01)

(58) Field of Classification Search
CPC ..... B41J 2/16532; B41J 29/38; B41J 29/02; B41J 23/025
USPC ..... 347/37, 108
See application file for complete search history.

(56) References Cited

U.S. PATENT DOCUMENTS

| | | | | |
|---|---|---|---|---|
| 5,480,243 | A | 1/1996 | Kikkawa et al. | |
| 5,595,448 | A * | 1/1997 | Harada | B41J 19/005 347/37 |
| 5,907,343 | A * | 5/1999 | Takemura | B41J 2/1652 346/145 |
| 8,405,865 | B2 | 3/2013 | Warnes | |
| 9,242,488 | B2 * | 1/2016 | Samoto | B41J 13/0018 |
| 2002/0021343 | A1 | 2/2002 | Uchida | |
| 2006/0133880 | A1 | 6/2006 | Goeree et al. | |
| 2009/0243209 | A1 | 10/2009 | Samoto | |

FOREIGN PATENT DOCUMENTS

| | | | |
|---|---|---|---|
| JP | H04131263 | A | 5/1992 |
| JP | H0524296 | A | 2/1993 |
| JP | 2000158741 | A | 6/2000 |
| JP | 2002103736 | A | 4/2002 |
| JP | 2002264419 | A | 9/2002 |
| JP | 2006175860 | A | 7/2006 |
| JP | 2007118504 | A | 5/2007 |

(Continued)

*Primary Examiner* — Minh Nguyen
(74) *Attorney, Agent, or Firm* — Banner & Witcoff, Ltd.

(57) ABSTRACT

The liquid ejection apparatus with a liquid jetting head and support members is described. A first support member and a second support member support a guide and feeding roller in a scanning direction and are attached to a housing of the liquid ejection apparatus. The housing at the location to which the first support member is attached is easier to deform in the scanning direction than housing at the location to which the second support member is attached. Further, the housing at the first location may include a projection. The first support member may be attached to the projection.

13 Claims, 6 Drawing Sheets

(56) References Cited

FOREIGN PATENT DOCUMENTS

| | | | |
|---|---|---|---|
| JP | 2010125687 | A | 6/2010 |
| JP | 4600504 | B2 | 12/2010 |
| JP | 2012526005 | A | 10/2012 |
| JP | 2013007768 | A | 1/2013 |

* cited by examiner

INKJET RECORDING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application *is a reissue of U.S. Pat. No. 9,044,951 issued Jun. 2, 2015, filed on Mar. 5, 2014 as U.S. patent application Ser. No. 14/197,783, which* claims priority from Japanese Patent Application No. 2013-048044 filed on Mar. 11, 2013, which is incorporated herein by reference in its entirety.

FIELD OF DISCLOSURE

The disclosure herein relates to a liquid ejection apparatus configured to eject liquid from nozzles thereof.

BACKGROUND

A known liquid ejection apparatus is configured to eject liquid from nozzles thereof. A liquid ejection apparatus, e.g., a multi-function device, includes a printer section configured to perform printing by ejecting ink from nozzles thereof. In the multi-function device, a carriage on which a liquid ejection head, e.g., a recording head, is mounted, is configured to move in a scanning direction while being guided by a guide portion, e.g., two guide rails. The two guide rails are fixed to a frame disposed below the guide rails. More specifically, the frame is a plate-like member including metallic material. The frame includes a bottom plate extending in the scanning direction and fixed to an upper surface of a base, e.g., a housing, including resin material. The frame further includes a side plate integrally provided with the bottom plate at each end of the frame in the scanning direction. The side plates are provided by bending the plate-like member upward with respect to the bottom plate. The two guide rails are fixed to upper end portions of the side plates. The side plates of the frame support a feeding roller configured to feed a recording sheet.

The resin material of the housing has a higher coefficient of linear expansion than the metallic material of the frame. Therefore, the housing readily expands and contracts, for example, with ambient temperature changes. However, as described above, the frame includes the bottom plate and the two side plates that are integrally provided by bending the plate-like member including the metallic material at each end thereof with respect to the scanning direction. The frame has a relatively high rigidity. Therefore, even when the housing is deformed, for example, with ambient temperature changes, the positional relationship between two side plates of the frame is unlikely to change. Accordingly, the positional relationship between the guide rails fixed to the side plates and the feeding roller supported by the side plates is unlikely to change. Consequently, the positional relationship between the recording head mounted on the carriage configured to move in the scanning direction while being guided by the guide rails, and a medium, e.g., a recording sheet, fed by the feeding roller is unlikely to change. Thus, reduction in the printing quality is prevented or reduced.

Nevertheless, the frame includes the bottom plate elongated in the scanning direction, so that the frame becomes relatively heavy in weight. Therefore, the liquid ejection apparatus including such frame becomes heavy in weight. A space is required in the printer section to place the bottom plate extending in the scanning direction. In view of reductions of weight and size of the liquid ejection apparatus, two separate members corresponding to the two side plates may be provided in place of the frame including the bottom plate and the two side plates. The two members may be fixed to the housing. In this case, however, there is not a portion corresponding to the bottom plate between the two members. Therefore, when the housing expands and contracts, for example, with ambient temperature changes, the positional relationship between the two members is likely to change. Therefore, the positional relationship between the feeding roller supported by the two members and the guide rails is likely to change. Consequently, the positional relationship between the liquid ejection head and the medium may change, so that the printing quality may possibly be reduced.

SUMMARY

A liquid ejection apparatus with a liquid jetting head and support members is described. A first support member and a second support member support at least one of a guide and feeding roller in a scanning direction and are attached to a housing of the liquid ejection apparatus. The housing at the location to which the first support member is attached is easier to deform in the scanning direction than housing at the location to which the second support member is attached. Further, the housing at the first location may include a projection. The first support member may be attached to the projection.

BRIEF DESCRIPTION OF THE DRAWINGS

Reference now is made to the following description taken in connection with the accompanying drawings.

DETAILED DESCRIPTION

Figure 1:
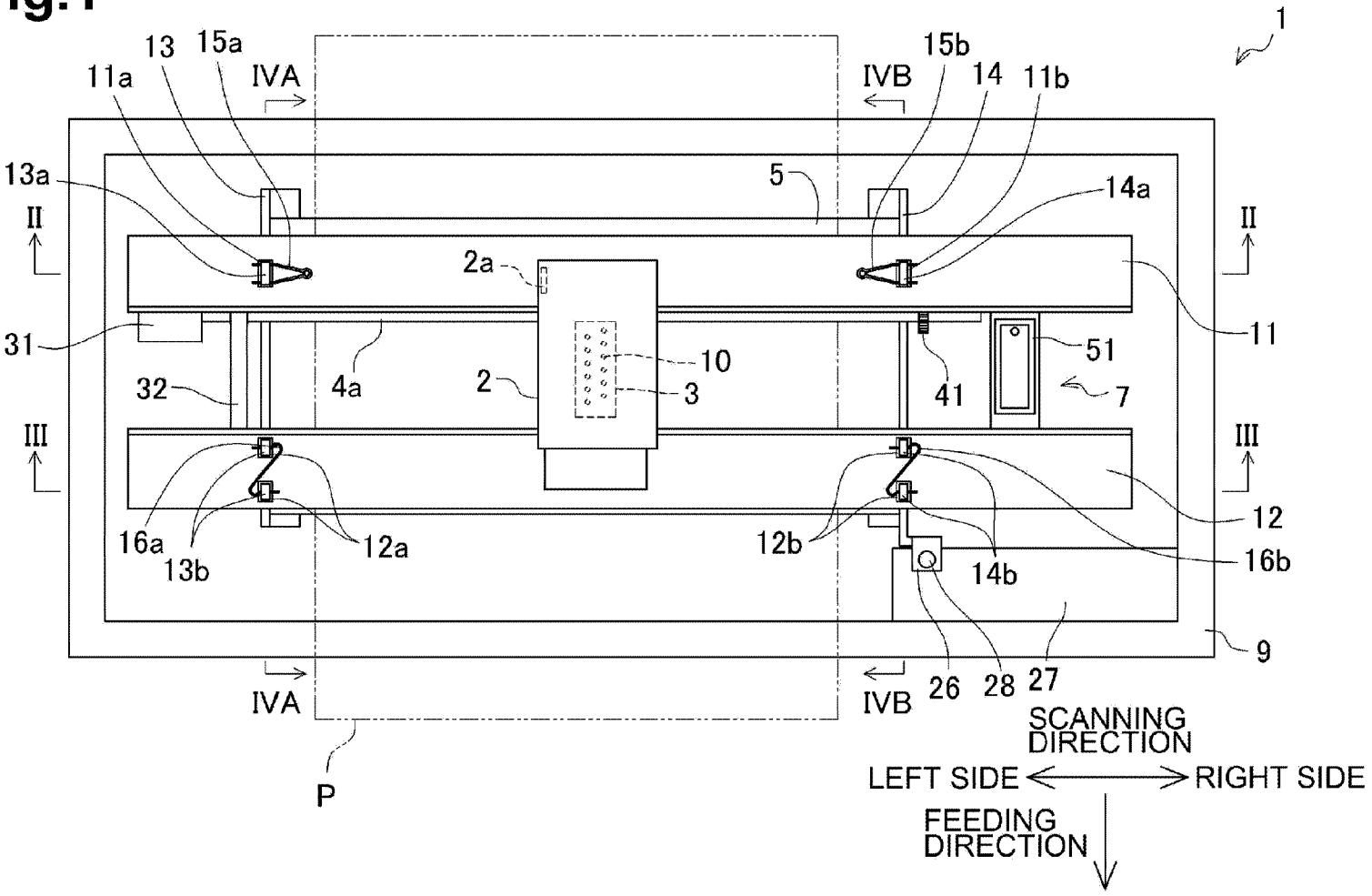
FIG. 1 is a diagram depicting a printer in an illustrative embodiment according to one or more aspects of the disclosure.

As depicted in FIGS. 1-4, a liquid ejection apparatus, e.g., a printer 1, may comprise a base, e.g., a housing 9, comprising synthetic resin material, a carriage 2, an inkjet head 3, driven portions, e.g., a first feeding roller 4a and a second feeding roller 4b, a medium support member, e.g., a platen 5, a tray accommodation portion 6, and another driven portion, e.g., a maintenance unit 7. The right side and the left side of the printer 1 may be defined herein with respect to a scanning direction and may be indicated in the relevant figures.

The carriage 2 may be supported by two guide rails 11 and 12 extending in the scanning direction from below. The carriage 2 may be configured to move in the scanning direction while being guided by the guide rails 11 and 12. The guide rails 11 and 12 may be disposed with a distance therebetween in a feeding direction perpendicular to the scanning direction. A portion of each guide rail 11 and 12 near its left end may be supported by a first support member 13. A portion of each guide rail 11 and 12 near its right end may be supported by a second support member 14.

The support members 13 and 14 may comprise metallic material. The support members 13 and 14 may extend in a perpendicular direction, e.g., a vertical direction, perpendicular to the scanning direction and the feeding direction. A lower end portion of each support member 13 and 14 may be bent inward with respect to the scanning direction. Each support member 13 and 14 may have generally an L-shape when viewed from the feeding direction. The support members 13 and 14 may be disposed with a distance therebetween in the scanning direction. The "lower end portion" as used herein is an example of attachment portions of the support members 13 and 14 that are configured to be attached to housing 9. Depending on the orientation of the support members 13 and 14 and how they are attached to housing 9, the attachment portions of support members 13 and 14 may be identified by a descriptive orientation other than "lower".

The support members 13 and 14 may extend across the guide rails 11 and 12 in the feeding direction. Each support member 13 and 14 may comprise protrusions 13a and 14a, respectively, that may be disposed at upper end portions thereof opposing the guide rail 11 to partially protrude upwardly from the guide rail 11. The protrusions 13a and 14a. The guide rail 11 may have through holes 11a and 11b at portions opposing the protrusions 13a and 14a, respectively. The protrusions 13a and 14a may be inserted into the through holes 11a and 11b, respectively, to extend or protrude above the guide rail 11. Portions of the protrusions 13a and 14a above the guide rail 11 may have through holes 13a1 and 14a1, respectively, passing through in the scanning direction. The through holes 13a1 and 14a1 may be configured to receive springs 15a and 15b, respectively, that may be fixed to the upper surface of the guide rail 11. Thus, the support members 13 and 14 may be fixed to the guide rail 11 at the protrusions 13a and 14a, respectively.

The first support member 13 may comprise two protrusions 13b that may be disposed with a distance therebetween in the feeding direction. The two protrusions 13b may be disposed at upper end portions of the first support member 13 opposing the guide rail 12 to partially protrude upwardly from the guide rail 12. The guide rail 12 may have two through holes 12a at portions opposing the protrusions 13b. Each protrusion 13b may be inserted into the corresponding through hole 12a, to extend or protrude above the guide rail 12. A portion of each protrusion 13b extending above the guide rail 12 may have a through hole 13b1 passing through in the scanning direction. The through holes 13b1 of the protrusions 13b may be configured to receive a spring 16a that may be fixed to the upper surface of the guide rail 12. The spring 16a may extend between the two protrusions 13b. Thus, the first support member 13 may be fixed to the guide rail 12 at the protrusions 13b.

The second support member 14 may comprise two protrusions 14b that may be disposed with a distance therebetween in the feeding direction. The two protrusions 14b may be disposed at upper end portions of the second support member 14 opposing the guide rail 12 to partially protrude upwardly from the guide rail 12. The guide rail 12 may have two through holes 12b at portions opposing the protrusions 14b. Each protrusion 14b may be inserted into the corresponding through hole 12b, to extend or protrude above the guide rail 12. A portion of each protrusion 14b extending above the guide rail 12 may have a through hole 14b1 extending or passing through in the scanning direction. The through holes 14b1 of the protrusions 14b may be configured to receive a spring 16b that may be fixed to the upper surface of the guide rail 12. The spring 16a may extend across the space between two protrusions 13b. Thus, the second support member 14 may be fixed to the guide rail 12 at the protrusions 14b.

A lower end portion (e.g., one end portion in the perpendicular direction), of each support member 13 and 14 may be fixed to the housing 9 of the printer 1. More specifically, the housing 9 may comprise two first fixture portions 21a and 21b at portions of the upper surface of the housing 9 opposing lower end portions of the first support member 13 extending in the scanning direction. The first fixture portions 21a and 21b may be disposed with a distance therebetween in the feeding direction at respective locations on the housing 9. The lower end portions of the first support member 13 extending in the scanning direction may be fixed to the first fixture portions 21a and 21b with fastening members, e.g., bolts 25, that may extend in the vertical direction. The housing 9 may further comprise two second fixture portions 22a and 22b at portions of the upper surface of the housing 9 opposing lower end portions of the second support member 14 extending in the scanning direction at respective locations on the housing 9. The second fixture portions 22a and 22b may be disposed with a distance therebetween in the feeding direction. The lower end portions of the second support member 14 extending in the scanning direction may be fixed to the second fixture portions 22a and 22b with fastening members, e.g., the bolts 25, that may extending in the vertical direction.

Figure 2:
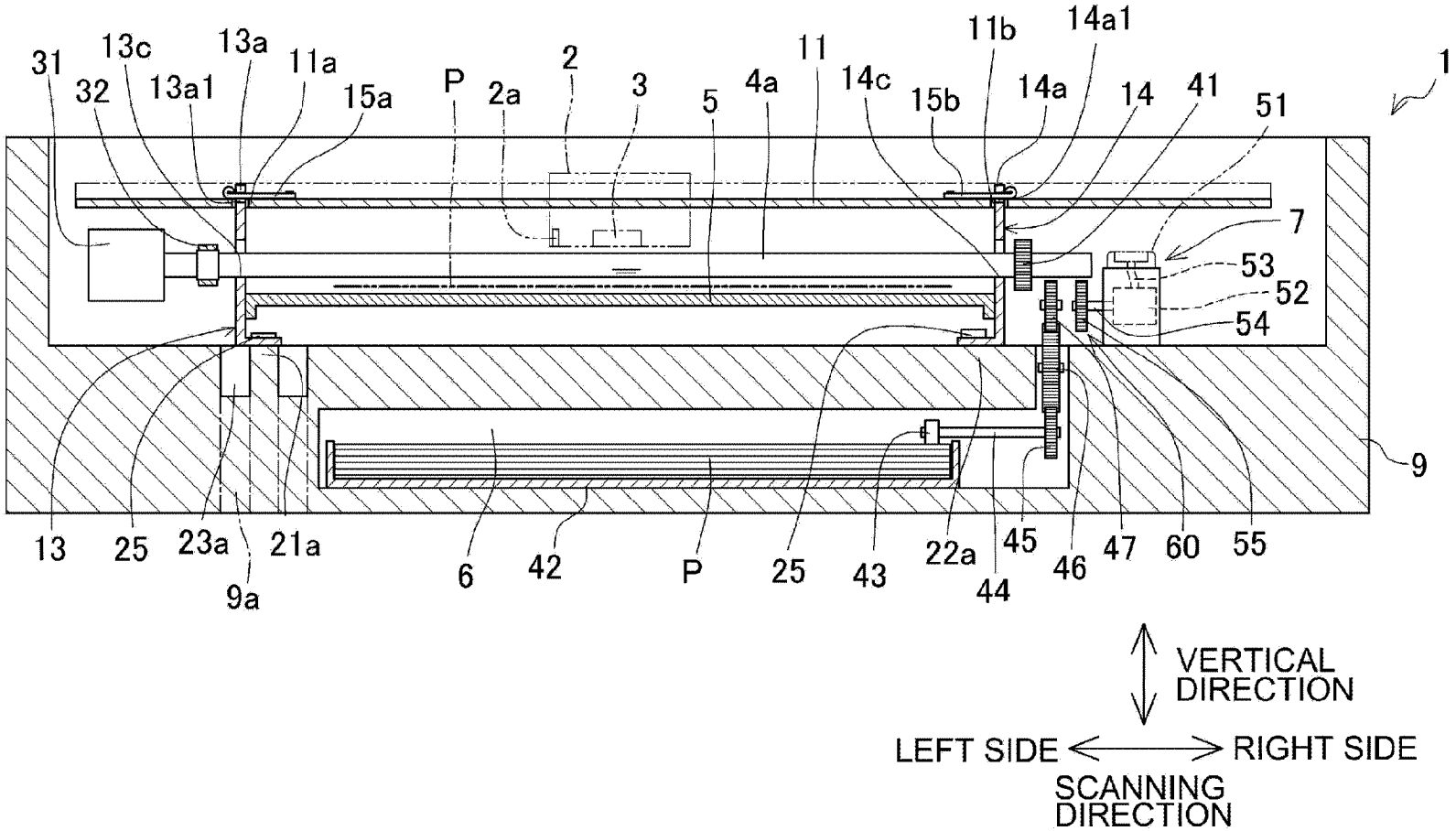
FIG. 2 is a sectional view of the printer, taken along the line II-II of FIG. 1.
Figure 3:
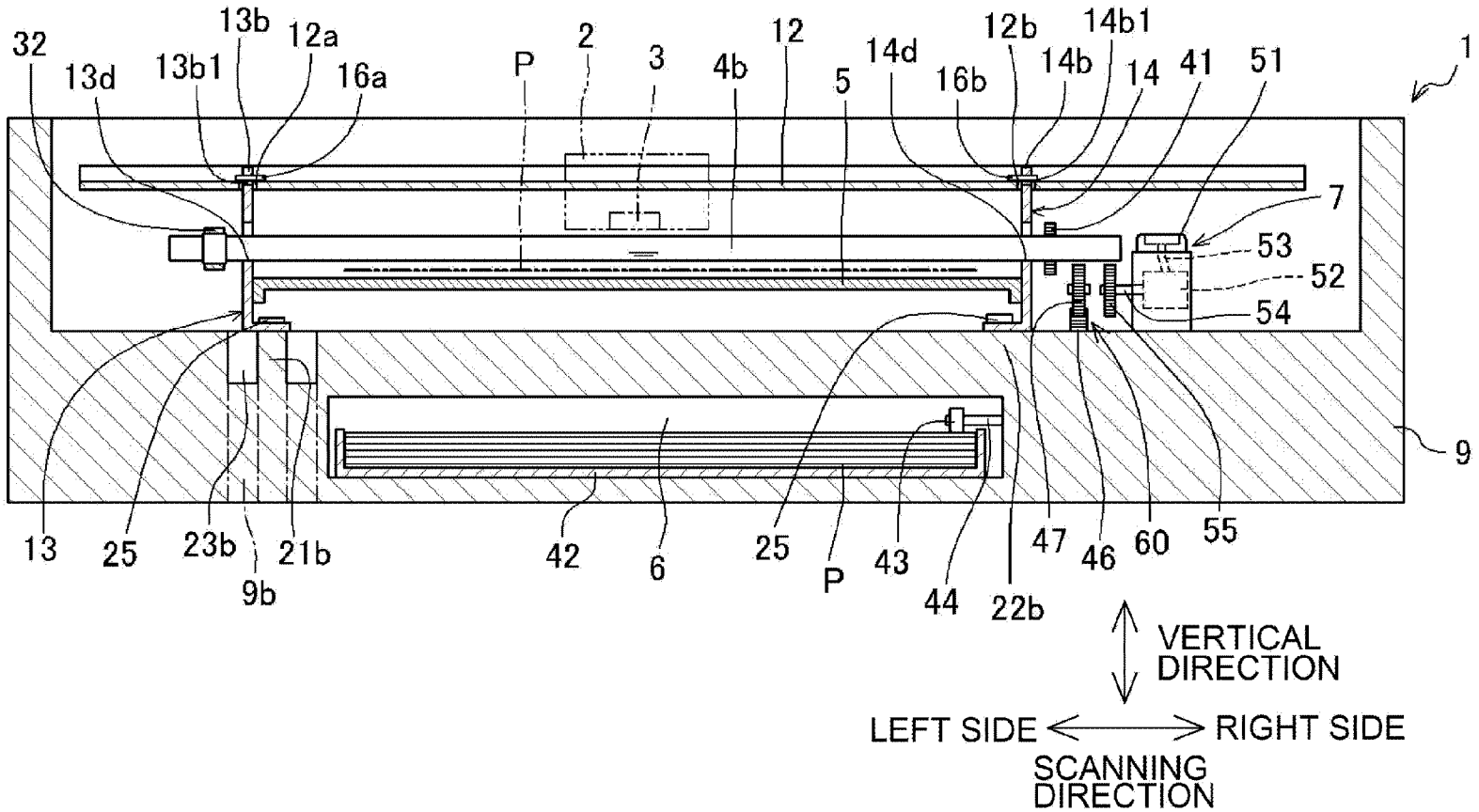
FIG. 3 is a sectional view of the printer, taken along the line III-III of FIG. 1.
Figure 4A:
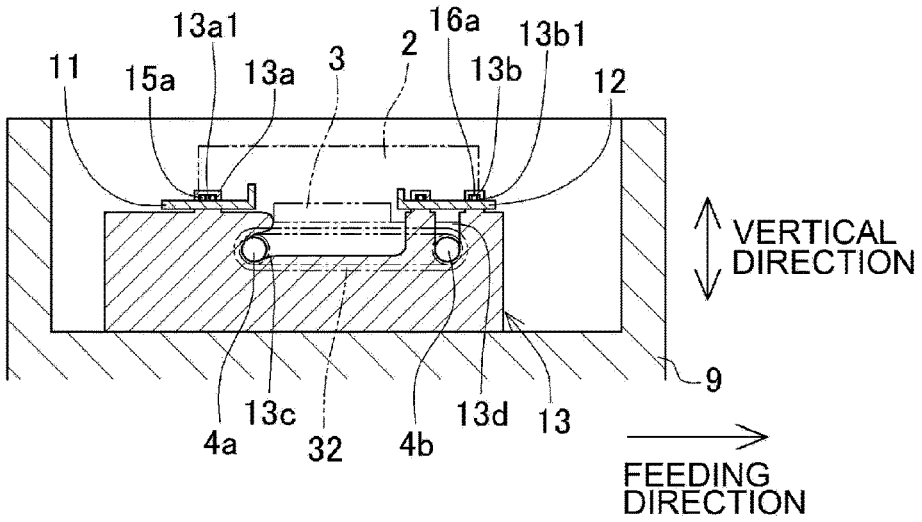
FIG. 4A is a sectional view of the printer, taken along the line IVA-IVA of FIG. 1.
Figure 4B:
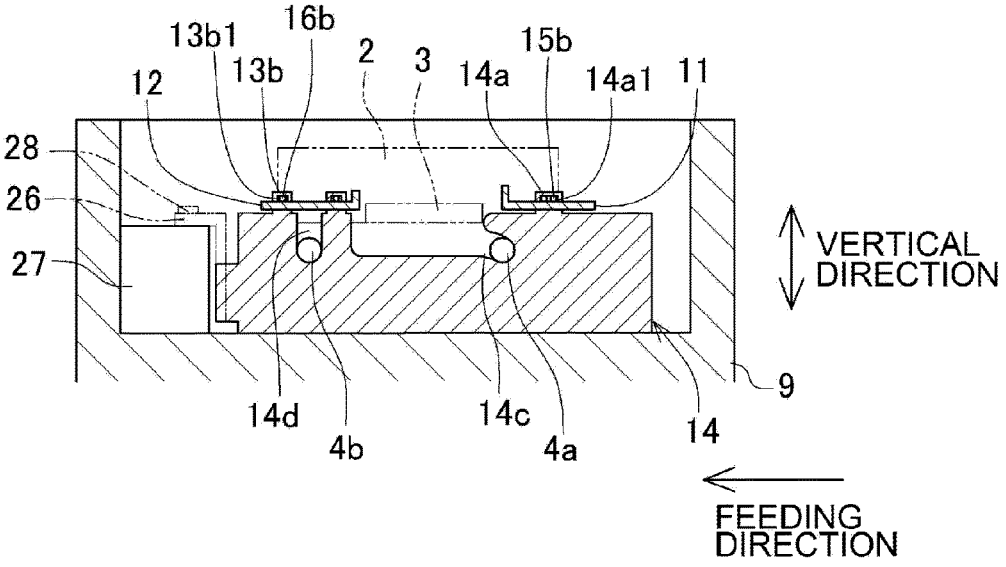
FIG. 4B is a sectional view of the printer, taken along the line IVB-IVB of FIG. 1.
Figure 5A:
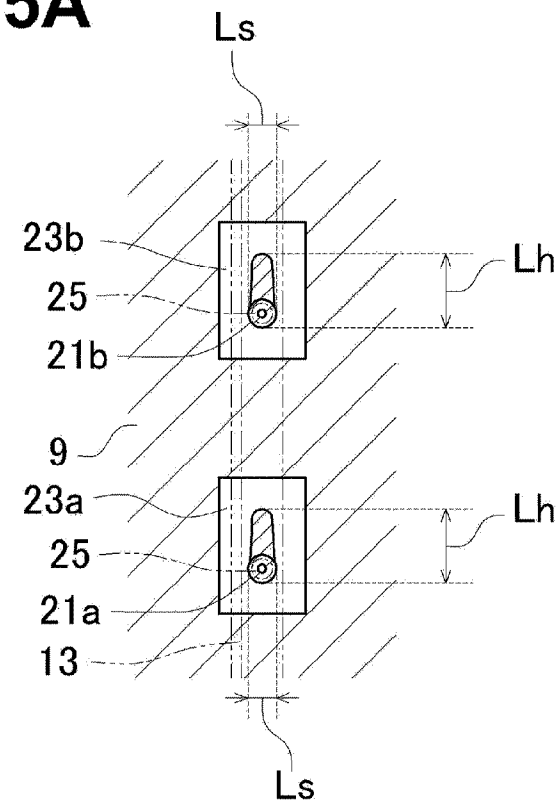
FIG. 5A is a diagram depicting an upper surface of a base of the printer near first fixture portions of the printer.
Figure 5B:
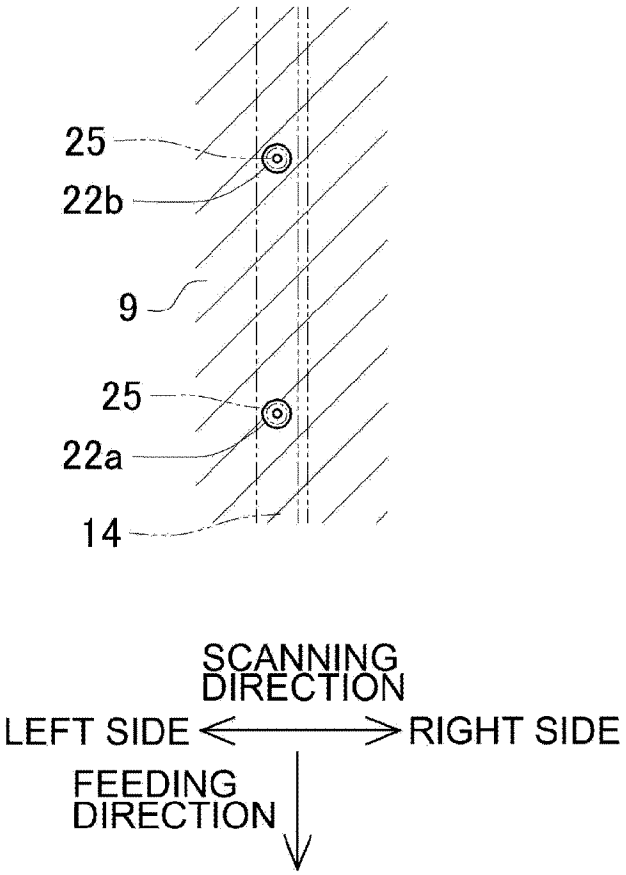
FIG. 5B is a diagram depicting the upper surface of the base near second fixture portions of the printer.

As depicted in FIGS. 2 and 5A, the housing 9 may have recesses 23a and 23b at portions 9a and 9b thereof surrounding the peripheries of the first fixture portions 21a and 21b, respectively. Each recess 23a and 23b may entirely surround the periphery of the respective first fixture portion 21a and 21b. Thus, the first fixture portions 21a and 21b may protrude upward (e.g., toward an opposite end in the perpendicular direction) from the portions 9a and 9b, respectively, having the recesses 23a and 23b formed around the first fixture portions 21a and 21b. As depicted in FIGS. 2 and 5B, a recess might not be provided at the portions 9a and 9b of the housing 9 surrounding the peripheries of the second fixture portions 22a and 22b. The second fixture portions 22a and 22b may be generally the same level as the peripheries of the second fixture portions 22a and 22b. The upper surface of the housing 9 may be hatched in FIGS. 5A and 5B, to facilitate the understanding of the drawings. Further, to facilitate the understanding positions where the support members 13 and 14 may be fixed to the upper surface of the housing 9, the positions of the support members 13 and 14 and the bolts 25 may be depicted in two-dot chain lines in FIGS. 5A and 5B.

In the illustrative embodiment, the first fixture portions 21a and 21b may deform more readily in the scanning direction and the feeding direction than the second fixture portions 22a and 22b. As depicted in FIG. 5A, a length Lh of each of the first fixture portions 21a and 21b, in the feeding direction, that may protrude upward from their peripheries may be longer than a length Ls of each of the first fixture portions 21a and 21b in the scanning direction. Thus, the first fixture portions 21a and 21b may be more difficult to deform in the feeding direction than in the scanning direction.

A portion of the second support member 14 extending in the vertical direction may extend longer toward a downstream side in the feeding direction than a lower end portion thereof extending in the scanning direction. The second support member 14 may comprise an attachment portion 26 disposed at a downstream end portion of the vertical portion of the second support member 14 in the feeding direction. As described above, the second support member 14 may be fixed to the second fixture portions 22a and 22b at lower end portions of the second support member 14. In addition, the attachment portion 26 may be fixed to a fixture portion 27 of the housing 9 with a bolt 28. In other words, the second support member 14 may be fixed to the housing 9 at the attachment portion 26a on an upper side, e.g., opposite end side, of the lower end portions fixed to the second fixture portions 22a and 22b, at a position different from the protrusions 14a and 14b fixed to the guide rails 11 and 12, respectively.

The inkjet head 3 may be received on the carriage 2. The inkjet head 3 may be configured to eject ink from nozzles 10 formed on the lower surface of the inkjet head 3. The first feeding roller 4a may be disposed on an upstream side of the inkjet head 3 in the feeding direction. The second feeding roller 4b may be disposed on a downstream side of the inkjet head 3 in the feeding direction. The feeding rollers 4a and 4b may be configured to feed a recording sheet P in the feeding direction. In the illustrative embodiment, a combination of the first feeding roller 4a and the second feeding roller 4b may be an example of a feeding roller.

The first support member 13 may comprise a roller support portion 13c at a portion downstream of the protrusion 13a in the feeding direction. The first support member 13 may further comprise a roller support portion 13d at a portion between the two protrusions 13b in the feeding direction The second support member 14 may comprise a roller support portion 14c at a portion downstream of the protrusion 14a in the feeding direction. The second support member 14 may further comprise a roller support portion 14d at a portion between the two protrusions 14b in the feeding direction. A portion of the first feeding roller 4a near its left end portion may be supported by the roller support portion 13c and a portion of the first feeding roller 4a near its right end portion may be supported by the roller support portion 14c. A portion of the second feeding roller 4b near its left end portion may be supported by the roller support portion 13d and a portion of the second feeding roller 4b near its right end portion may be supported by the roller support portion 14d.

A motor 31 may be connected to the left end portion of the first feeding roller 4a. The first feeding roller 4a may be configured to rotate as the motor 31 rotates. An endless belt 32 may be wound around the feeding rollers 4a and 4b at a portion between the first support member 13 and the motor 31 in the scanning direction (e.g., on a side opposite to the second fixture portions 22a and 22b relative to the first fixture portions 21a and 21b). As the first feeding roller 4a rotates, the rotation of the first feeding roller 4a may be transmitted to the second feeding roller 4b via the belt 32, and thus the second feeding roller 4b may rotate.

A gear 41 may be mounted to the first feeding roller 4a to the right side of the second fixture portions 22a and 22b and the second support member 14 in the scanning direction (e.g., a side opposite to the first fixture portions 21a and 21b). The gear 41 may be configured to rotate together with the first feeding roller 4a and to move in the scanning direction along the first feeding roller 4a. The gear 41 may be urged by a spring (not depicted) toward the left side in the scanning direction. When the gear 41 does not contact a pressing portion 2a of the carriage 2, the gear 41 may be placed at a position to engage with none of gears 47 and 55, as depicted in FIG. 2.

The platen 5 may be disposed opposite to the lower surface of the inkjet head 3 having the nozzles 10. The platen 5 may be configured to support the recording sheet P fed by the feeding rollers 4a and 4b from below. The platen 5 may be fixed to the support members 13 and 14. The tray accommodation portion 6 may be provided in the housing 9 at a position lower than the first fixture portions 21a and 21b and the second fixture portions 22a and 22b. The tray accommodation portion 6 may be positioned almost directly below the platen 5. The tray accommodation portion 6 may be configured to removably accommodate a sheet tray 42. The sheet tray 42 may be configured to hold one or more recording sheets P stacked in the vertical direction.

A driven portion, e.g., a pickup roller 43, may be disposed in the tray accommodation portion 6. The pickup roller 43 may be configured to contact the upper surface of the topmost recording sheet P held in the sheet tray 42 when the sheet tray 42 is attached to the tray accommodation portion 6. The pickup roller 43 may be coupled, via a shaft 44 that may extend in the scanning direction, to a gear 45 that may be disposed to the right side of the second fixture portions 22a and 22b and the second support member 14 (e.g., a side opposite to the first fixture portions 21a and 21b). The gear 45 may engage with a gears 46 disposed above the gear 45. The gears 46 may engage with a gear 47 disposed above the gear 46.

Figure 6A:
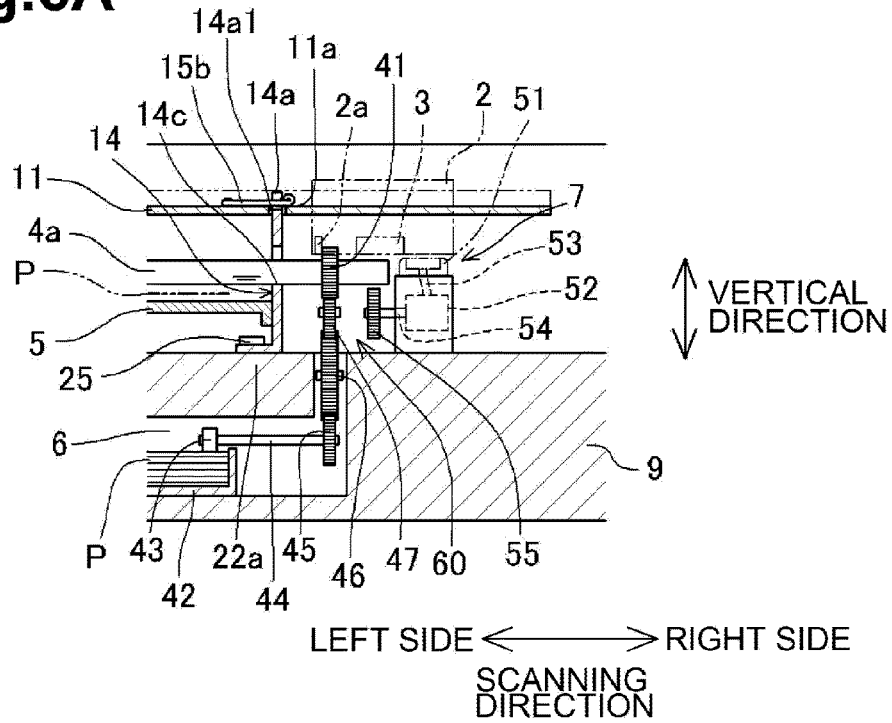
FIG. 6A is a partially sectional view of the printer depicting a state of a gear mechanism of the printer when a pickup roller of the printer is rotated.

The carriage 2 may comprise the pressing portion 2a that may be disposed at a left end position of the carriage 2 in the scanning direction below the guide rail 11. The pressing portion 2a may be configured to oppose the gear 41 in the scanning direction. When the carriage 2 is moved to the right of the second support member 14 as depicted in FIG. 6A, the gear 41 may be pushed by the pressing portion 2a to move rightward in the scanning direction, so that the gear 41 may be placed at a position to engage with the gear 47. In this state, as the motor 31 is rotated, the rotation of the motor 31 may be transmitted to the pickup roller 43, via the first feeding roller 4a, the gear 41, 45-47 and the shaft 44. Thus, the pickup roller 43 may rotate. As the pickup roller 43 rotates, the recording sheet P held in the sheet tray 42 may be fed toward the first feeding roller 4a. A feeding path of the recording sheet P from the sheet tray 42 to the first feeding roller 4a may be similar to a known feeding path. Therefore, a detail description of the feeding path may be omitted herein.

Figure 6B:
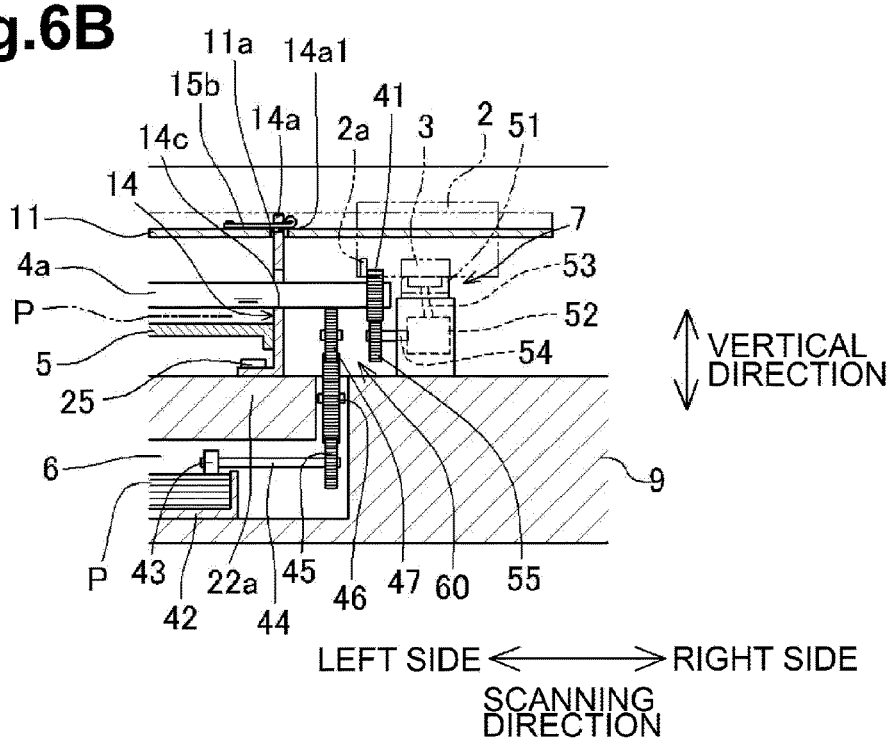
FIG. 6B is a partially sectional view of the printer depicting a state of the gear mechanism when a suction purge is performed.

The maintenance unit 7 may comprise a nozzle cap 51 and a suctioning pump 52. The nozzle cap 51 may be disposed to be placed generally directly below the inkjet head 3 when the carriage 2 is moved nearly to the rightmost position. When the carriage 2 is moved to a position where the inkjet head 3 opposes the nozzle cap 51, as depicted in FIG. 6B, an upper end portion of the nozzle cap 51 may contact the lower surface of the inkjet head 3. Thus, the nozzles 10 may be covered with the nozzle cap 51. The suctioning pump 52 may comprise a tube pump. The suctioning pump 52 may be connected to the nozzle cap 51 via a tube 53. The suctioning pump 52 may be coupled, via a shaft 54 extending in the scanning direction, to the gear 55 that may be disposed between the maintenance unit 7 and the second fixture portions 22a and 22b (e.g., on a side opposite to the first fixture portions 21a and 21b relative to the second fixture portions 22a and 22b). In the illustrative embodiment, the gears 55, 41 and 45-47 may constitute a gear mechanism 60.

As the carriage 2 is moved in the scanning direction to a position where the inkjet head 3 is covered with the nozzle cap 51, as depicted in FIG. 6B, the gear 41 may be pushed by the pressing portion 2a to move rightward in the scanning direction, so that the gear 41 may be placed to engage with the gears 55. In this state, as the motor 31 is rotated, the rotation of the motor 31 may be transmitted to the suctioning pump 52, via the first feeding roller 4a, the gears 41 and 55 and the shaft 54, so that the suctioning pump 52 may be driven. Thus, a so-called suction purge may be performed in which ink in the inkjet head 3 may be suctioned from the nozzles 10.

In the printer 1, the synthetic resin material of the housing 9 may have a higher coefficient of linear expansion than that of a metallic material of the support members 13 and 14. Therefore, the housing 9 may more readily expand and contract, for example, with ambient temperature changes, as compared with the support members 13 and 14.

In the illustrative embodiment, as described above, the housing 9 may have the recesses 23a and 23b at the portions 9a and 9b surrounding the peripheries of the first fixture portions 21a and 21b, respectively. Thus, the first fixture portions 21a and 21b may more readily deform in the scanning direction than the second fixture portions 22a and 22. Therefore, the housing 9 may expand and contract in the scanning direction with almost no change in the positional relationship between the first support member 13 fixed to the first fixture portions 21a and 21b and the second support member 14 in the scanning direction as the first fixture portions 21a and 21b deform in the scanning direction. Therefore, when the housing 9 expands and contracts with temperature changes, the positional relationship between the first support member 13 and the second support member 14 in the scanning direction may be difficult or unlikely to change.

Thus, the positional relationship of the guide rails 11 and 12 fixed to the support members 13 and 14, the feeding rollers 4a and 4b supported by the support members 13 and 14, and the platen 5 fixed to the support members 13 and 14 may be unlikely to change. Therefore, the positional relationship between the inkjet head 3 mounted on the carriage 2 configured to move in the scanning direction while being guided by the guide rails 11 and 12, and the recording sheet P supported by the platen 5 and fed by the feeding rollers 4a and 4b may also be difficult or unlikely to change. Consequently, reduction in the printing quality in the printer 1 may be prevented or reduced.

In the illustrative embodiment, the first support member 13 and the second support member 14 may be non-integral with each other. Therefore, the weight of the printer 1 may be reduced, as compared with a case in which a frame integrally formed with a portion corresponding to the first support member 13, a portion corresponding to the second support member 14 and a portion connecting the first and second support portions 13 and 14 is provided in place of the support members 13 and 14.

As described above, when the first fixture portions 21a and 21b are configured to deform readily in the scanning direction, the strength of the first fixture portions 21a and 21b may be reduced. In the illustrative embodiment, the length Lh of the first fixture portions 21a and 21b in the feeding direction may be set longer than the length Ls of the first fixture portions 21a and 21b in the scanning direction, as described above. Therefore, the first fixture portions 21a and 21b may be configured to be more difficult to deform in the feeding direction than in the scanning direction.

In the illustrative embodiment, each of the support members 13 and 14 may extend in the feeding direction across the two guide rails 11 and 12. Therefore, when the housing 9 expands and contracts, for example, with ambient temperature changes even through the first fixture portions 21a and 21b are difficult to deform in the feeding direction, the positional relationship between the two guide rails 11 and 12 in an arrangement direction of the guide rails 11 and 12 might not be readily changed, as compared with a case in which a support member is separately provided for each guide rail 11 and 12, e.g., each of the support members 13 and 14 might not extend in the feeding direction across the two guide rails 11 and 12.

In the illustrative embodiment, the gear mechanism 60 comprising the gears 41, 45-47 and 55 may be disposed to the right side of the second fixture portions 22a and 22b and the second support member 14 in the scanning direction. Unlike the illustrative embodiment, the gear mechanism 60 comprising the gears 41, 45-47 and 55 may be disposed to the left side of the first fixture portions 21a and 21b and the first support member 13 in the scanning direction. In this case, when the first fixture portions 21a and 21b are deformed in the scanning direction in association with the expansion and contraction of the housing 9, for example, with ambient temperature changes, the gears 41, 45-47 and 55 may possibly be inclined with the movement of the first fixture portions 21a and 21b or the first support member 13 fixed to the first fixture portions 21a and 21b. Consequently, distance between the shafts of the gears 41, 45-47 and 55 is reduced, so that significant load may possibly be applied to the gears 41, 45-47 and 55, or distance between the shafts of the gears 41, 45-47 and 55 may become too wide, so that gear skipping or damages on tooth tips may possibly be caused.

In the illustrative embodiment, the gear mechanism 60 may be disposed to the right side of the second fixture portions 22a and 22b that may be configured to be more difficult to deform in the scanning direction than the first fixture portions 21a and 21b, and the second support member 14 fixed to the second fixture portions 22a and 22b. Therefore, such an inclination of the gears 41, 45-47 and 55 as described above might not be caused readily. Thus, occurrences of such problems as described above, e.g., reduction or increase of the distance between the shafts of the gears 41, 45-47 and 55, in the gear mechanism 60 may be reduced or prevented.

In the illustrative embodiment, the belt 32 configured to connect the first feeding roller 4a and the second feeding roller 4b may be disposed to the left side of the first fixture portions 21a and 21b and the first support member 13. Therefore, when the first fixture portions 21a and 21b are deformed in association with the expansion and contraction of the housing 9, for example, with ambient temperature changes, the belt 32 may possibly be slanted or twisted with the movement of the first fixture portions 21a and 21b and the first support member 13. However, even when the belt 32 is slightly slanted or twisted, such a problem that a significant load is applied to the belt 32 may be unlikely to occur.

When the first support member 13 and the second support member 14 are separated from each other as in the illustrative embodiment, the first support member 13 and the second support member 14 may be more likely to move or vibrate in the scanning direction when the carriage 2 moves in the scanning direction, as compared with a case in which the first support member 13 and the second support member 14 are integrally formed. In the illustrative embodiment, lower end portions of the second support member 14 may be fixed to the second fixture portions 22a and 22b. In addition, the attachment portion 26 that may be disposed at a portion of the second support member 14 extending in the vertical direction may be fixed to the fixture portion 27 of the housing 9. Thus, the movement or vibration of the second support member 14 in the scanning direction may be reduced or prevented.

In the illustrative embodiment, each support member 13 and 14 may have generally an L shape when viewed from the feeding direction with a portion thereof extending in the vertical direction and a lower end portion thereof bent inward in the scanning direction. Therefore, distance between the first fixture portions 21a and 21b and the second fixture portions 22a and 22b, respectively, in the scanning direction may be reduced, as compared with a case in which the lower end portion of each support member 13 and 14 is bent outward in the scanning direction. An amount of expansion and contraction of a portion of the housing 9 between the first fixture portions 21a and 21b and the second fixture portions 22a and 22b when the housing 9 expands and contracts, for example, with ambient temperature changes may become smaller as the distance between the first fixture portions 21a and 21b and the second fixture portions 22a and 22b in the scanning direction is shorter. Therefore, in the example embodiment in which the distance between the first fixture portions 21a and 21b and the second fixture portions 22a and 22b may be relatively short, the positional relationship between the first support member 13 and the second support member 14 may be more unlikely to change when the housing 9 expands and contracts, for example, with ambient temperature changes. Further, the size of the printer 1 may be reduced in the scanning direction because the distance between the first fixture portions 21a and 21b and the second fixture portions 22a and 22b in the scanning direction may be relatively short.

In the illustrative embodiment, the first support member 13 may be fixed to the first fixture portions 21a and 21b with the bolts 25 extending in the vertical direction. Therefore, the first support member 13 may make close contact with the first fixture portions 21a and 21b in the vertical direction, so that the first support member 13 may be difficult to move in the vertical direction relative to the first fixture portions 21a and 21b. In the illustrative embodiment, the first fixture portions 21a and 21b may be configured to deform readily in the scanning direction and configured to be more difficult to deform in the feeding direction and the vertical direction than in the scanning direction. Therefore, it may be preferable that the bolts 25 used to fix the first support member 13 to the first fixture portions 21a and 21b extend in the vertical direction, as in the illustrative embodiment, perpendicular to the scanning direction.

Various changes, arrangements and modifications may be applied to the above-described illustrative embodiment. Like reference numerals may be used for like corresponding components and a detailed description thereof with respect to the modifications may be omitted herein.

In the above-described illustrative embodiment, the lower end portions of the support members 13 and 14 may be bent inward in the scanning direction. Alternatively, the lower end portions of the support members 13 and 14 may be bent outward in the scanning direction.

In this case also, the first support member 13 may be fixed to the first fixture portions 21a and 21b using the bolts 25 extending in the vertical direction, similar to the above-described illustrative embodiment, so that the first support member 13 may become difficult to move in the vertical direction.

Further, each support member 13 and 14 might not be limited to have a generally an L shape when viewed from the feeding direction. Alternatively, each support member 13 and 14 may have a different shape. In this case, bolts configured to fix the first support member 13 to the first fixture portions 21a and 21b, and configured to fix the second support member 14 to the second fixture portions 22a and 22b may extend in a direction other than the vertical direction, e.g., the feeding direction or the scanning direction. However, it may be preferable that the bolts extend in a direction perpendicular to the scanning direction, e.g., the feeding direction.

In the above-described illustrative embodiment, lower end portions of the second support member 14 may be fixed to the second fixture portions 22a and 22b of the housing 9. In addition, the attachment portion 26 that may be disposed at a portion of the second support member 14 extending in the vertical direction may be fixed to the fixture portion 27 of the housing 9. Alternatively, the second support member 14 might not comprise the attachment portion 26 and may be fixed to the housing 9 at the second fixture portions 22a and 22b.

In the above-described illustrative embodiment, the gear mechanism 60 may be disposed to the right side of the second fixture portions 22a and 22b and the second support member 14. The belt 32 may be disposed to the left side of the first fixture portions 21a and 21b and the first support member 13. Alternatively, the gear mechanism 60 may be disposed to the left side of the first fixture portions 21a and 21b and the first support member 13, and the belt 32 may be disposed to the right side of the second fixture portions 22a and 22b and the second support member 14, unlike the above-described embodiment.

In the above-described illustrative embodiment, the first feeding roller 4a and the second feeding roller 4b may be connected via the belt 32. Alternatively, the gear mechanism 60 may further comprise a gear configured to connect the first feeding roller 4a and the second feeding roller 4b, and the belt 32 may be omitted. The gear mechanism 60 may be configured to transmit the rotation of the motor 31 to a driven portion other than the pickup roller 43, the suctioning pump 52, and the feeding rollers 4a and 4b. The gear mechanism 60 configured to transmit the power of the motor 31 to the maintenance unit 7 and the pickup roller 43 might not be provided but another drive source may be provided for the maintenance unit 7 and the pickup roller 43.

In the above-described illustrative embodiment, the platen 5 may be directly fixed to the support members 13 and 14. Alternatively, the platen 5 may be indirectly fixed to the support members 13 and 14, via members fixed to the support members 13 and 14.

Further, the platen 5 might not have to be fixed to the support members 13 and 14. In this case also, the positional relationship between the guide rails 11 and 12 and the feeding rollers 4a and 4b may be unlikely to change, as described above, so that the positional relationship between the inkjet head 3 and the recording sheet P may be unlikely to change.

In the above-described illustrative embodiment, the carriage 2 may be configured to be guided along the scanning direction while being supported by the two guide rails 11 and 12. Alternatively, the carriage 2 may be configured to be guided along the scanning direction while being supported by, for example, one guide rail. Further, a guide portion, e.g., a guide bar, that may extend in the scanning direction and be inserted through the carriage 2 may be supported by the support members 13 and 14. The carriage 2 may be supported by the guide bar and configured to be guided along the scanning direction. In this case, the guide bar may be fixed to the support members 13 and 14 by inserting the guide bar to openings in the support members 13 and 14.

In the above-described illustrative embodiment, the length Lh of each of the first fixture portions 21a and 21b in the feeding direction may be longer than the length Ls of each of the first fixture portions 21a and 21b in the scanning direction. Therefore, the first fixture portions 21a and 21b may be more difficult to deform in the feeding direction than in the scanning direction. Alternatively, the first fixture portions 21a and 21b may be configured to be more difficult to deform in the feeding direction than in the scanning direction with a structure different from the above-described structure.

Further, the first fixture portions 21a and 21b might not have to be more difficult to deform in the feeding direction than in the scanning direction. For example, the length Lh of each first fixture portion 21a and 21b in the feeding direction and the length Ls of each first fixture portion 21a and 21b in the scanning direction may be set to almost the same, so that each first fixture portion 21a and 21b may be configured to deform by approximately same amount in the feeding direction and the scanning direction.

In the above-described illustrative embodiment, the recess 23a and 23b may be disposed at the portions 9a and 9b of the housing 9 surrounding the first fixture portions 21a and 21b, respectively, so that the first fixture portions 21a and 21b may protrude upward from the portions 9a and 9b, respectively. Alternatively, for example, the portions 9a and 9b of the housing 9 surrounding the first fixture portions 21a and 21b might not have recesses but the first fixture portions 21a and 21b according to the above-described illustrative embodiment may protrude upward from the surface of housing 9.

In the above-described illustrative embodiment, the first fixture portions 21a and 21b may be configured to deform readily in the scanning direction because the first fixture portions 21a and 21b may protrude more upward than the portions 9a and 9b surrounding the first fixture portions 21a and 21b, respectively. Alternatively, the first fixture portions 21a and 21b may be configured to readily deform in the scanning direction with a different structure.

In the illustrative embodiment, the disclosure may be applied to the inkjet printer 1 configured to perform printing by ejecting ink from the nozzles onto the recording sheet. Alternatively, the disclosure may be applied to liquid ejection apparatuses, other than the inkjet printer 1, configured to eject liquid other than ink onto a medium.

While the disclosure has been described in detail with reference to the specific embodiments thereof, this is merely an example, and various changes, arrangements and modifications may be applied therein without departing from the spirit and scope of the disclosure.

What is claimed is:

1. A liquid ejection apparatus comprising:

a liquid jetting head;

a carriage configured to move in a scanning direction and configured to support the liquid jetting head;

a guide extending in the scanning direction, the guide being configured to support the carriage through the carriage's movement in the scanning direction, the guide being formed of a first material;

a feeding roller extending in the scanning direction and configured to feed a medium in a feeding direction, the feeding direction being [is] perpendicular to the scanning direction, the feeding roller having a first side and a second side spaced from each other in the scanning direction;

a first support member supporting the feeding roller at the first side of the feeding roller and supporting the guide, the first support member including an attachment portion;

a second support member supporting the feeding roller at the second side of the feeding roller and supporting the guide, the second support member including an attachment portion; and a housing being formed of a second material, the housing including a first [location] *fixture portion* to which the attachment portion of the first support member is fixed and including a second [location] *fixture portion* to which the attachment portion of the second support member is fixed, the *first fixture portion being located at a* first location [and the], *the second fixture portion being located at a* second location being spaced from [each other] *the first location* in the scanning direction,

[wherein the housing at the first location is easier to deform in the scanning direction than the housing at the second location] *wherein the housing includes a first surface that surrounds the first fixture portion and is lower than the first fixture portion in a direction perpendicular to both the scanning direction and the feeding direction, the first surface being further away than the first support member in the scanning direction from the second support member,*

*wherein the housing includes a second surface to which the second support member is attached,*

*wherein the first surface is lower than the second surface,*

*wherein the guide comprises a first guide member and a second guide member, which are arranged in the feeding direction, the first support member and the second support member extends in the feeding direction across the first guide member and the second guide member and being fixed by the first guide member and the second guide member, and*

*wherein the first fixture portion is more difficult to deform in the feeding direction than in the scanning direction.*

2. The liquid ejection apparatus according to claim 1, wherein the second material of the housing has higher coefficient of linear expansion than the first material of the guide.

[3. The liquid ejection apparatus according to claim 1, wherein the attachment portion of the first support member is fixed to the housing at the first location in a direction perpendicular to both the scanning direction and the feeding direction, the portion of the housing at the first location being a first fixture portion, and wherein the attachment portion of the second support member is fixed to the housing at the second location in the direction perpendicular to both the scanning direction and the feeding direction, the portion of the housing at the second location being a second fixture portion.]

[4. The liquid ejection apparatus according to claim 3, wherein the first fixture portion protrudes from a part of the housing surrounding the first fixture portion toward the first support member in the first direction.]

[5. The liquid ejection apparatus according to claim 3, wherein the guide comprises a first guide member and a second guide member, which are arranged in the feeding direction, the first support member and the second support member extends in the feeding direction across the first guide member and the second guide member and being fixed by the first guide member and the second guide member, and wherein the first fixture portion is more difficult to deform in the feeding direction than in the scanning direction.]

6. The liquid ejection apparatus according to claim [5] *1*, [wherein the first fixture portion protrudes from a part of the housing surrounding the first fixture portion toward a side of the first support member in the first direction, and]

wherein a length of the first fixture portion in the feeding direction is longer than in the scanning direction [so that the deformation of the first fixture portion in the feeding direction is easier than in the scanning direction].

7. The liquid ejection apparatus according to claim [3] *1*, further comprising:

a motor connected to the feeding roller, a driven portion configured to be driven by the motor, and a gear mechanism configured to transmit a rotatory power to the driven portion, wherein the driven portion and the gear mechanism is disposed on an opposite side of the second fixture portion with respect to the first fixture portion.

8. The liquid ejection apparatus according to claim 7, wherein the feeding roller comprises:

a first feeding roller connected to the motor, a second feeding roller which is away from the first feeding roller in the feeding direction, and a belt configured to transmit a rotatory power of the first feeding roller to the second feeding roller, wherein the belt is disposed on an opposite side of the second fixture portion with respect to the first fixture portion.

9. The liquid ejection apparatus according to claim [3] *1*, wherein the second support member is fixed with a particular part of the housing, *and* wherein the particular part is further away from the attachment portion of the second support member toward an opposite side of the second support member in the [perpendicular] direction *perpendicular to both the scanning direction and the feeding direction*.

10. The liquid ejection apparatus according to claim [3] *1*, wherein the first support member is fixed with the first fixture portion by a bolt extending [a particular] *in the* direction perpendicular to *both* the scanning direction *and the feeding direction*.

11. [The liquid ejection apparatus according to claim 10,] *A liquid ejection apparatus comprising:*

*a liquid jetting head;*

*a carriage configured to move in a scanning direction and configured to support the liquid jetting head;*

*a guide extending in the scanning direction, the guide being configured to support the carriage through the carriage's movement in the scanning direction, the guide being formed of a first material;*

*a feeding roller extending in the scanning direction and configured to feed a medium in a feeding direction, the feeding direction being perpendicular to the scanning direction, the feeding roller having a first side and a second side spaced from each other in the scanning direction;*

*a first support member supporting the feeding roller at the first side of the feeding roller and supporting the guide, the first support member including an attachment portion;*

*a second support member supporting the feeding roller at the second side of the feeding roller and supporting the guide, the second support member including an attachment portion; and*

*a housing being formed of a second material, the housing including a first fixture portion to which the attachment portion of the first support member is fixed and including a second fixture portion to which the attachment portion of the second support member is fixed, the first fixture portion being located at a first location, the second fixture portion being located at a second location being spaced from the first location in the scanning direction,*

*wherein the first support member is fixed with the first fixture portion by a bolt extending in the direction perpendicular to both the scanning direction and the feeding direction,* wherein each of the first support member and the second support member extends in the [perpendicular] direction *perpendicular to both the scanning direction and the feeding direction*, and each of the first support member and the second support member has an L-shape with each's attachment portion extending into an inner side of the housing in the scanning direction, wherein the attachment portion of the first support member is fixed with the first fixture portion by the bolt, and wherein the attachment portion of the second support member is fixed with the second fixture portion by the bolt.

12. The liquid ejection apparatus according to claim 1, further comprising:

a medium support member configured to support the medium fed by the feeding roller, the medium support member fixed on the first support member and the second support member.

13. The liquid ejection apparatus according to claim 1, wherein the first support member and the second support member are non-integral with each other.

*14. A liquid ejection apparatus comprising:*

*a liquid jetting head;*

*a carriage configured to move in a scanning direction and configured to support the liquid jetting head;*

*a guide extending in the scanning direction, the guide being configured to support the carriage through the carriage's movement in the scanning direction, the guide being formed of a first material;*

*a feeding roller extending in the scanning direction and configured to feed a medium in a feeding direction, the feeding direction being is perpendicular to the scanning direction, the feeding roller having a first side and a second side spaced from each other in the scanning direction;*

*a first support member supporting the feeding roller at the first side of the feeding roller and supporting the guide, the first support member including an attachment portion;*

*a second support member supporting the feeding roller at the second side of the feeding roller and supporting the guide, the second support member including an attachment portion; and*

*a housing being formed of a second material, the housing including a first fixture portion to which the attachment portion of the first support member is fixed and including a second fixture portion to which the attachment portion of the second support member is fixed, the first fixture portion being located at a first location, the second fixture portion being located at a second location being spaced from the first location in the scanning direction,*

*wherein the housing includes a first horizontal surface that surrounds the first fixture portion and is lower than the first fixture portion in a direction perpendicular to both the scanning direction and the feeding direction, the first horizontal surface being further away than the first support member in the scanning direction from the second support member,*

*wherein the housing includes a second horizontal surface to which the second support member is attached,*

*wherein the first horizontal surface is lower than the second horizontal surface,*

*wherein the guide comprises a first guide member and a second guide member, which are arranged in the feeding direction, the first support member and the second support member extends in the feeding direction across the first guide member and the second guide member and being fixed by the first guide member and the second guide member, and*

*wherein the first fixture portion is more difficult to deform in the feeding direction than in the scanning direction*

*wherein the guide comprises a first guide member and a second guide member, which are arranged in the feeding direction, the first support member and the second support member extends in the feeding direction across the first guide member and the second guide member and being fixed by the first guide member and the second guide member, and*

*wherein the first fixture portion is more difficult to deform in the feeding direction than in the scanning direction.*

*15. The liquid ejection apparatus according to claim 1,*

*wherein expansion and contraction of the housing relative to the guide due to heat occurs at the first support member.*

*16. The liquid ejection apparatus according to claim 1,*

*wherein the first surface is a first horizontal surface, and wherein the second surface is a second horizontal surface.*

* * * * *